(12) United States Patent
Jokimies et al.

(10) Patent No.: US 6,788,952 B1
(45) Date of Patent: Sep. 7, 2004

(54) CELL SELECTION AND RESELECTION IN A MULTIPLE MODULATION CELLULAR RADIO SYSTEM

(75) Inventors: Matti Jokimies, Salo (FI); Markus Hakaste, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 817 days.

(21) Appl. No.: 09/224,234

(22) Filed: Dec. 30, 1998

(30) Foreign Application Priority Data

Jan. 7, 1998 (FI) .................................. 980020

(51) Int. Cl.[7] .............................................. H04B 7/00
(52) U.S. Cl. ...................... 455/525; 455/434; 455/453; 455/455; 455/464; 370/337
(58) Field of Search ................................ 455/436–442, 455/552, 553, 426, 453, 455, 463, 464, 525, 524; 370/332, 335, 337, 329

(56) References Cited

U.S. PATENT DOCUMENTS

| | | | | |
|---|---|---|---|---|
| 4,675,863 A | * | 6/1987 | Paneth et al. ................ | 370/334 |
| 4,829,519 A | * | 5/1989 | Scotton et al. ............... | 714/708 |
| 4,972,506 A | * | 11/1990 | Uddenfeldt .................. | 370/337 |
| 4,973,923 A | | 11/1990 | Kuisma ....................... | 332/117 |
| 5,091,919 A | | 2/1992 | Kuisma ....................... | 375/60 |
| 5,124,672 A | | 6/1992 | Kuisma ....................... | 332/103 |
| 5,231,364 A | | 7/1993 | Mucke ........................ | 332/105 |
| 5,241,685 A | * | 8/1993 | Bodin et al. ................. | 455/453 |
| 5,301,359 A | | 4/1994 | Van den Heuvel et al. | 455/56.1 |
| 5,311,151 A | | 5/1994 | Vaisanen ..................... | 332/105 |
| 5,345,448 A | | 9/1994 | Keskitalo .................... | 370/95.3 |
| 5,353,332 A | | 10/1994 | Raith et al. .................. | 379/59 |
| 5,357,221 A | | 10/1994 | Matero ........................ | 332/123 |
| 5,371,481 A | | 12/1994 | Tiittanen et al. ............. | 332/103 |
| 5,392,460 A | | 2/1995 | Mattila et al. ................ | 455/76 |
| 5,410,733 A | | 4/1995 | Niva et al. ................... | 455/33.2 |
| 5,412,375 A | * | 5/1995 | Wood ...................... | 340/825.03 |
| 5,446,422 A | | 8/1995 | Mattila et al. ............... | 332/103 |
| 5,469,126 A | | 11/1995 | Murtojarvi ................... | 332/105 |
| 5,483,668 A | | 1/1996 | Malkamaki et al. ........ | 455/33.2 |

(List continued on next page.)

FOREIGN PATENT DOCUMENTS

| | | | |
|---|---|---|---|
| EP | 0701337 A2 | 3/1996 | |
| EP | 0 878 924 A2 | 11/1998 | |
| EP | 0878924 | * 11/1998 | ............ H04B/7/26 |
| WO | WO 96/28947 | 9/1996 | |
| WO | WO 97/21294 | 6/1997 | |

OTHER PUBLICATIONS

"Digital cellular telecommunications system (Phase 2); Functions related to Mobile Station (MS) in idle mode" (GSM 03.22) ETS 300 535 Mar. 1996.
"Digital cellular telecommunications system (Phase 2+); General Packet Radio Service (GPRS); Overall description of the GPRS radio interface"; Stage 2 (GSM 03.64 version 5.0.0).
ETSI "European digital cellular telecommunications system (Phase2); Radio subsystem link control" (GSM 05.08).
Finnish Patent Application FI 970855 and English translation thereof.
PCT International Search Report.

*Primary Examiner*—Charles Appiah
(74) *Attorney, Agent, or Firm*—Perman & Green, LLP

(57) ABSTRACT

A cellular system comprises base stations and terminals. A certain first base station (105) supports only a certain first modulation method (301) and a certain second base station (104) supports both the first modulation method (301) and a certain second modulation method (302). In order to perform cell reselection there is communicated information to the terminal (101) about which modulation method those base station support, the cells of which are possible new cells for the terminal. A new cell is selected by utilizing the information about which modulation methods the base station support.

20 Claims, 5 Drawing Sheets

U.S. PATENT DOCUMENTS

| | | | |
|---|---|---|---|
| 5,524,009 A | | 6/1996 | Tuutijarvi et al. .......... 370/95.3 |
| 5,602,868 A | * | 2/1997 | Wilson ...................... 375/219 |
| 5,655,003 A | * | 8/1997 | Erving et al. ................ 379/418 |
| 5,659,598 A | | 8/1997 | Byrne et al. ................ 455/436 |
| 5,678,224 A | | 10/1997 | Murtojarvi .................. 455/326 |
| 5,710,974 A | | 1/1998 | Granlund et al. .......... 455/33.2 |
| 5,731,772 A | | 3/1998 | Mikkola et al. ............ 341/118 |
| 5,732,076 A | * | 3/1998 | Ketseoglou et al. ........ 370/347 |
| 5,768,267 A | * | 6/1998 | Raith et al. ................. 370/329 |
| 5,774,809 A | | 6/1998 | Tuutijarvi et al. .......... 455/437 |
| 5,809,399 A | | 9/1998 | Tuutijarvi et al. ............ 455/63 |
| 5,815,801 A | | 9/1998 | Hamalainen et al. ......... 455/63 |
| 5,845,192 A | | 12/1998 | Saunders ................... 455/11.1 |
| 5,909,469 A | * | 6/1999 | Frodigh et al. ............. 375/302 |
| 5,924,026 A | * | 7/1999 | Krishnan ................... 455/414 |
| 5,983,101 A | * | 11/1999 | Billstrom ................... 455/426 |
| 5,991,286 A | * | 11/1999 | Labonte et al. ............. 370/337 |
| 6,006,073 A | * | 12/1999 | Glauner et al. ............ 455/67.1 |
| 6,023,615 A | * | 2/2000 | Bruckert et al. ......... 455/277.2 |
| 6,035,197 A | * | 3/2000 | Haberman et al. ......... 455/439 |
| 6,091,954 A | * | 7/2000 | Haartsen et al. ............ 455/447 |

* cited by examiner

CELL SELECTION AND RESELECTION IN A MULTIPLE MODULATION CELLULAR RADIO SYSTEM

TECHNICAL FIELD

The invention relates generally to the selection of that cell where a certain cellular system terminal operates at any given time. Particularly the invention relates to the optimisation of the cell selection and relection in a system, which has cells providing different features relating to the transmission of information, and in which the terminals have different abilities to utilise these features.

BACKGROUND OF THE INVENTION

A cellular radio system comprises stationary base stations, each having a certain coverage area, and terminals which can move in relation to the base stations and their coverage areas. The coverage areas are also called cells. In this patent application a mobile phone is treated as an exemplary terminal. When a particular mobile phone is switched on, it performs a cell selection. In other words it somehow tries to find the best received base station signal and tries to register with the so called location area (LA) which represents this base station. Registering means that the mobile phone notifies the mobile network through the base station that it can receive calls via that location area, with which said base station is associated. In the idle mode a mobile phone regularly receives messages transmitted by the base station in order to detect paging messages, which represent an incoming telephone call, and other messages intended for this mobile phone. At the same time the mobile phone monitors the power of signals transmitted by other adjacent base stations, so that it rapidly can change the base station, when required. Changing the base station in idle mode or during some form of packet-switched connections is called cell reselection. Changing the base station during a circuit-switched connection is known as a handover.

In prior art cellular systems the base stations are mutually substantially similar concerning the data transmission features, i.e. a mobile phone receives the same service from the network, regardless of in which cell it operates. An exception is formed by some cell priority arrangements, with which the mobile phones are controlled to operate in cells belonging to a particular home area, or to avoid certain so called handover cells. In the home area arrangement a geographically fixed home area is defined for a mobile phone by an agreement between the user and the operator maintaining the cellular system. When a mobile phone operates in the home area cells it will get a reduction on the common call charges, or other benefits.

In prior art cellular systems also the terminals have data transmission features which are very close to each other. Usually only one type of air interface is defined in the system, whereby the air interface definitions relate to the timing of transmission and reception, the available frequencies, the transmission rate, i.e. the bit rate used in the data transmission, and other corresponding factors.

The actions for selecting a cell in the GSM system (Global System for Mobile telecommunications) and in its extension DCS1800 (Digital Communications System at 1800 MHz) are defined in the EBU (European Broadcasting Union) and ETSI (European Telecommunications Standards Institute) standards ETS 300 535 (GSM 03.22) and ETS 300 578 (GSM 05.08). The actions for selecting a cell relating to a packet switched GPRS arrangement (General Packet Radio Service) are defined in the draft standard GSM 03-64. On a general level the same considerations can be applied also in other digital cellular systems. Cell selection is also discussed in the Finnish patent application no. FI-970855 (Nokia Mobile Phones Oy). Cell selection or reselection can also be called selection of the base station, because a certain base station is responsible for the radio communications in each cell. In addition to the GSM system the present invention can find application for instance in a cellular system according to the IS-136 standard (Interim Standard 136) and in the planned UMTS system (Universal Mobile Telecommunications System).

There are four requirements on the cell so that a mobile phone could camp in it normally:

the cell must belong to that operator's network, which is selected to be used, the network must not have barred the cell, the location area represented by the cell must not belong to the list of forbidden location areas defined for each mobile phone, and the attenuation on the radio path between the mobile phone and the base station must be lower than a certain threshold value determined by the operator (this requirement is for short called the path loss criterion).

A cell which meets the above mentioned requirements is called a suitable cell.

When the mobile phone has been switched on it runs through the so called BCCH (Broadcast Control CHannel) signals which it has received, in their order of strength, and settles to operate in that suitable cell, which has the strongest signal. The BCCH signal can also contain a recommendation value related to the cell, which indicates whether the cell is a suitable cell or not from the system point of view. The mobile phone settles to operate in a non-suitable cell only if there are no available suitable cells. This phase is called cell selection. The present invention is basically applicable to both cell selection and reselection, which can be jointly designated as "selecting a cell".

A mobile phone will regularly examine whether there is a suitable cell in the neighbourhood, which regarding the radio connection would be more advantageous than the current cell, and when required it makes a cell reselection. The mobile phone can make a reselection due to three alternative reasons:

the new cell is better than the current cell according to certain cell reselection criteria, some of the characteristics of the current cell changes so that the cell is not anymore a suitable cell, but a new cell is suitable, or the mobile phone detects that the downlink signalling connection in the current cell is disconnected.

The cell selection and cell reselection are based on two parameters calculated by the mobile phone, the so called C1 and C2 parameters, which are defined in the standard ETS 300 578 (GSM 05.08). Of these the first or the C1 parameter represents the power level received by the mobile phone from the considered base station, compared to the minimum value of the received power level and to the allowed maximum transmission power level of the mobile phone, which are defined in the system. The value of the C2 parameter is affected by the value of the C1 parameter and by two correction factors, of which the first one is an offset parameter transmitted by the base station, and the second is a delay intended to prevent rapid consecutive cell reselections by the mobile phone. Further the so called C31 and C32 parameters are used in the GPRS system, which parameters in other respects correspond to the C1 and C2 parameters, but the calculation of them utilises initial values, which are characteristic for hierarchic cell structures and for packet switched connections.

In order to increase the transmission capacity in digital cellular systems the trend is towards more effective modulation methods than the current ones, at least regarding the data channels. In an enhanced form of the GSM system the object is to advance from the GMSK modulation (Gaussian Minimum Shift Keying) to a modulation method which enables a higher bit rate. Below the QAM modulation (Quadrature Amplitude Modulation) is used as an example of a modulation method of this type; alternative embodiments of the QAM modulation are at least the B-O-QAM and the Q-O-QAM (Binary Offset QAM, Quaternary Offset QAM), of which the first one is in a way a subset of the second one. Another suitable new modulation method is CPM (Continuous Phase Modulation), of which a possible embodiment is the $\pi/4$-DBCPM (Differentially encoded Binary CPM). In prior art there are not any known methods or devices which would take into account the effects of modulation changes on cell selection.

SUMMARY OF THE INVENTION

The object of the present invention is to present a method for cell selection and/or reselection, which takes into account the ability of the base stations and the terminals to use different modulation methods. An object of the invention is also to present a base station and a terminal for realising in practice the method according to the invention.

The objects of the invention are attained by including in the general information transmitted by the base station also information about the modulation methods supported by the base station and possibly also by other base stations surrounding it, whereby the terminal can select a new cell so that the base station of the new cell supports the modulation required by the terminal.

The method according to the invention is characterised in that it comprises steps, in which
 the terminal is notified of which modulation methods are supported by those base stations with cells, which are possible new cells of the terminal, and
 a new cell for the terminal is selected by utilising information about which modulation methods are supported by those base station with cells, which are possible new cells of the terminal.

The invention relates also to a base station, which is characterised in that it comprises means for including information about which modulation methods the base station supports in the control information transmitted to the terminals. Further the invention relates to a cellular system terminal, which comprises means for receiving information from the base station and means for generating and processing comparison information representing several base stations for the cell reselection, and which is characterised in that it comprises means for including information about which modulation methods the base station support in the generation of said comparison information.

The base station transmits information on a so called broadcast control channel to all terminals operating in the cell. This information can include information about which modulation methods the base station supports. When the terminal selects a possible new cell it places the possible new cells in an order of preference, which is affected by the signal strength received from their base stations and by the information about which modulation methods each base station supports. The terminal tries to select as a new cell that cell, where the base station is received better than a certain target level, and which further can operate with that modulation, which from the terminal's point of view is currently the most advantageous. In the case of a packet switched radio connection the selection made by the terminal can also be affected by how high transmission capacity the new base station can provide. If the terminal must select a base station, which supports one or more modulation methods, which do not represent an optimum regarding the terminal, then the terminal tries to change to a more optimal cell as soon as possible. The preference for optimal cells regarding the modulation methods is most simply realised by including a factor representing the modulation methods in the calculation formula representing the preference order.

BRIEF DESCRIPTION OF DRAWINGS

The invention is described below in more detail with reference to preferred embodiments presented as examples, and to the enclosed figures, in which.

The same reference numerals are used for corresponding parts in the figures.

DETAILED DESCRIPTION OF THE INVENTION

Figure 1:
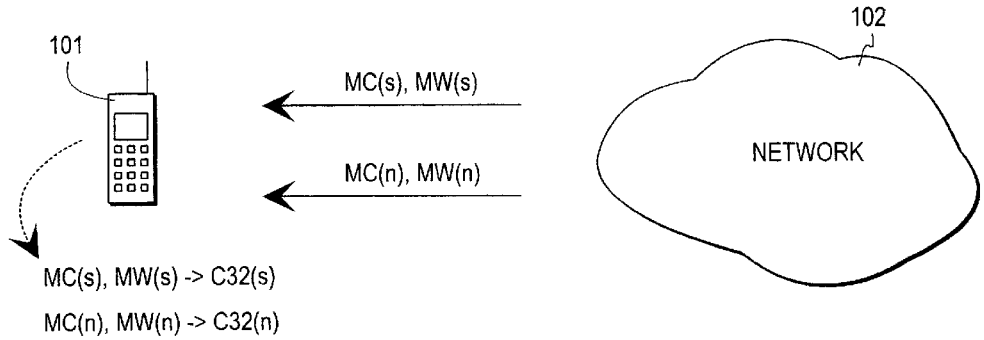
FIG. 1 shows a method according to the invention.

To begin with we discuss the realisation of the invention in a GPRS system. The criteria concerning cell selection and reselection in a manner according to prior art and their use are described in the standard GSM 03.64, version 5.0.0, paragraph 6.5.6.2, which gives the following formulae for calculating the C31 parameter:

$$C31(s)=RLA(s)-HCS\_THR(s) \geq 0 \qquad (1a)$$

$$C31(n)=RLA(n)-HCS\_THR(n) \geq 0 \qquad (1b)$$

In both formulae (s) refers to the present cell and (n) refers to a certain neighbour cell of the current cell. The formula 1a indicates how the parameter C31(s) relating to the present cell is calculated, and the formula 1b indicates how the parameter C31(n) relating to a neighbour cell of the present cell is calculated. The abbreviation RLA represents the words Received Level Average, and it means the average power level of the radio signal received from the base station. HCS-THR represents the words Hierarchical Cell Structures THReshold, and it means the required minimum received power level. The network signals the HCS_THR values to the terminals. The same paragraph of the same standard gives the following formulae for calculating the C32 parameter:

$$C32(s)=C1(s)+GPRS\_RESELECT\_OFFSET(s) \qquad (2a)$$

$$C32(n)=C1(n)+GPRS\_RESELECT\_OFFSET(n)-GPRS\_RESELECT\_XHYST(n)*H(RLA(s)-RXLEV\_TRH(s))-TEMPORARY\_OFFSET(n)*H(PENALTY\_TIME(n)-T(n)) \qquad (2b)$$

The calculation of the parameter C1 as well as the parameters TEMPORARY_OFFSET, PENALTY_TIME and T are defined in the standard GSM 05.08. The function H(x) is defined so that H(x)=0 when x<0, and otherwise H(x)=1. The factor GPRS_RESELECT_OFFSET determines the offset value and the hysteresis factor relating to each cell. The factor GPRS_RESELECT_XHYST determines a particular extra offset value and an extra hysteresis factor when the signal power RLA(s) received in the current cell is higher than the threshold value RXLEV_TRH(s). The network signals to the terminals the required parameters, which appear in the formulae 2a and 2b.

The invention is particularly advantageously realised in the GPRS system so, that on the right hand side in the formula 2a there is added the factor MC(s)*MW(s), and on the right hand side in the formula 2b there is correspondingly added the factor MC(n)*MW(n). Here MC is a value, which represents the modulation ability of the cell's base station, and which can be expressed even by one bit if there are modulation abilities of only two types. The MC bit can be for instance 0, if the base station supports only the GMSK modulation, an 1 if the base station supports the QAM modulation. MW is a factor, which in the cell selection represents the weight of the modulation, and which has a value space depending on how many bits are used to express it. MW can have for instance values from 0 to 63, if it is expressed by six bits. The actual MW value of each cell depends on the choices made by the operator responsible for the operation of the cellular system. According to FIG. 1 the terminal 101 usually obtains the MC and MW values as signalling from the network 102. For this purpose it is possible to generate new signalling message, or then the MC and MW values are included in the for the present undefined parts of a previously defined signalling message. Such a previously defined signalling message can be the same message, in which the base station indicates those frequencies, which the terminal must measure in order to measure the signal strength of other neighbour base stations. MW can have a generally agreed constant value, which is used when the MW value is not separately transmitted from the network to the terminal. Thus the formulae according to the invention would be of the form:

$$C32(s)=MC(s)*MW(s)+C1(s)+GPRS\_RESELECT\_OFFSET(s) \quad (2a')$$

$$C32(n)=MC(n)*MW(n)+C1(n)+GPRS\_RESELECT\_OFFSET(n)-GPRS\_RESELECT\_XHYST(n)*H(RLA(s)-RXLEV\_TRH(s))-TEMPORARY\_OFFSET(n)*H(PENALTY\_TIME(n)-T(n)) \quad (2b')$$

where the term on the middle row in formula 2b' can be ignored according to the above mentioned alternative proposal.

Figure 2:
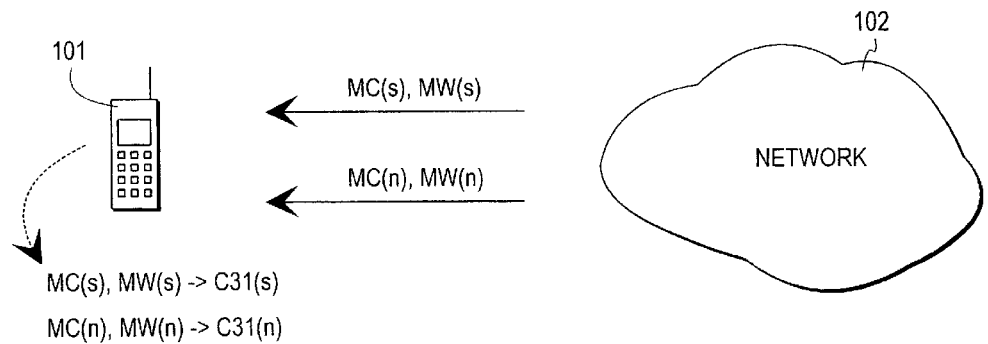
FIG. 2 shows a second method according to the invention.

Another possibility to include the modulation methods supported by the base stations in the calculation formulae used by the terminals is shown in FIG. 2, where the terminal 101 uses the MC and MW values for the calculation of the C31 parameters according to the formulae $$C31(s)=MC(s)*MW(s)+RLA(s)-HCS\_THR(s) \geq 0 \quad (1a')$$

$$C31(n)=MC(n)*MW(n)+RLA(n)-HCS\_THR(n) \geq 0 \quad (1b')$$

Figure 3:
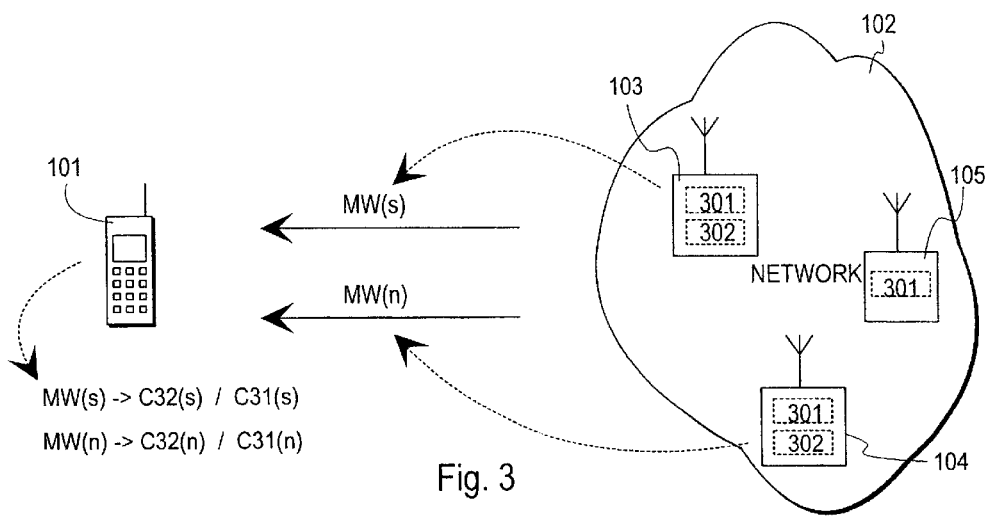
FIG. 3 shows a third method according to the invention.

A third alternative according to FIG. 3 is that the network 102 transmits to the terminals a non-zero MW value concerning only such base stations 103 and 104, which support the new modulation methods, whereby a separate MC value is not needed at all: a terminal 101 supporting the new modulation method knows that the base station 105 only supports the old modulation method, because it has not received any MW value concerning that base station, or because the MW value concerning that base station is zero.

In FIG. 3 the first modulation method 301 can be for instance the GMSK modulation, and the second modulation method 302 can be for instance QAM or CPM modulation. This possibility can be combined with the calculation of either the C32 or the C31 parameters. Then in the formulae 1a'–2b' above the MC value can be replaced by the value 1 or any other constant greater than zero. It must be observed that only such a terminal, which itself supports the new modulation methods, can use the formulae 1a'–2b'. The other terminals use the formulae 1a–2b in the usual way.

In the following we discuss a modification of the above presented embodiment. In packet switched data transmission the transmission rate between a transmitter and a receiver can be widely varying, depending on which modulation method can be used, due to the noise and interference conditions, and depending on how large a share of the total capacity determined by the frequency and the time can be used for one connection at a certain time. As an example we can consider a cellular system's cell, in which a terminal can be located either at the very boundary of the cell, or very close to the base station, and in which is applied the TDMA method (Time Division Multiple Access) having a frame length of eight time slots. When the terminal is at the boundary of the cell and the connection to the base station is poor, due to the long distance and interference from other sources, it must be assumed that only the B-O-QAM modulation can be used. If further only a single time slot is assigned to the connection, then the achievable transmission rate can be for instance 10 kbit/s. When the terminal is close to the base station, and the connection is correspondingly good, then Q-O-QAM modulation can provide a transmission rate of 60 kbit/s with a single time slot. If it is further possible to assign to the connection more time slots in the frame, then it is possible to achieve a maximal transmission rate of up to 500 kbit/s close to the base station.

Figure 4:
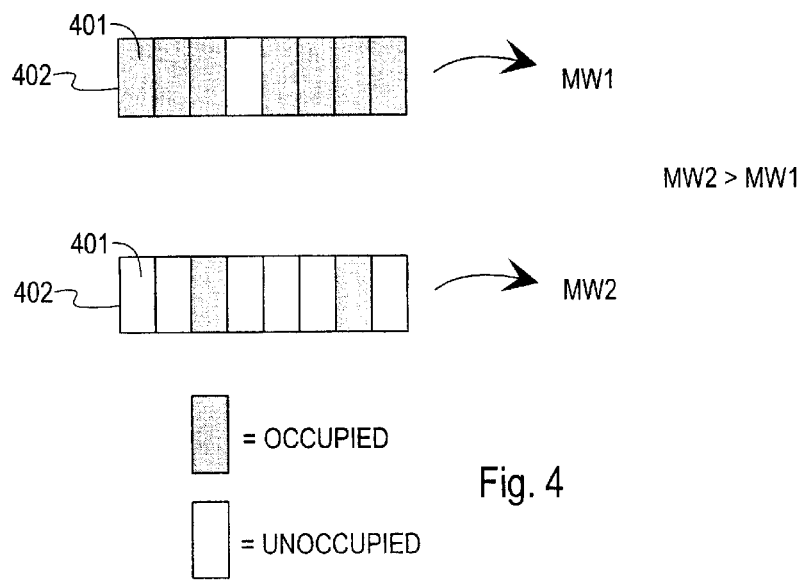
FIG. 4 shows a way to determine the MW values.

In order to be able to utilise the possibility to increase the transmission rate in a packet switched radio connection by increasing the number of time slots assigned to the connection the frame used in the cell must have unoccupied time slots, i.e. the cell load must be sufficiently low. The MW value of a cell representing each cell can vary according to the principle shown in FIG. 4, depending on how many time slots 401 are occupied in the frame 402 used in the cell: a low MW value MW1 would represent a heavily loaded cell, and a high MW value MW2 would represent a lightly loaded cell. When this is combined with the use of the above presented formulae 1a' and 1b', or 2a' and 2b', it controls the cell selection so that a terminal utilising these formulae tries to select a cell, where it can utilise the possibility to increase the transmission rate. In order to have updated MW values during rapid load variations it may be necessary to take special measures for signaling the MW values very often to the terminals. The same result can also be obtained so that instead of the MW values some other values representing the load and capacity of the base stations are signalled to the terminals, whereby these other values can for instance represent the highest transmission rate in a slot obtainable via a certain base station, the number of time slots available to packet switched connections in the cell, and the maximum number of time slots assignable to a single connection. On the basis of the information which the terminal receives, it then calculates a value representing an assumed available capacity and inserts this value (suitably scaled) in the formulae 1a'–2b' to replace the MC and/or the MW.

In the following we discuss how the invention is applied in the case of circuit switched connections. The standard GSM 05.08 defines how a prior art terminal calculates the above mentioned parameters C1 and C2, on the basis of which it selects a new cell. The following formulae are used particularly for the calculation of the C2 parameter $$C2(T)=C1+\text{CELL\_RESELECT\_OFFSET}-\text{TEMPORARY\_OFFSET}*H(\text{PENALTY\_TIME}-T) \quad (3a)$$

when the PENALTY_TIME<>11111, and $$C2=C1-\text{CELL\_RESELECT\_OFFSET}, \quad (3b)$$

when the PENALTY_TIME=11111, where the step function $H(x)$ is defined for the neighbour cells of the current cell as $H(x)=0$, when $x<0$, and $H(x)=1$, when $x \geq 0$, and for the current cell $H(x) \equiv 0$. T represents the value of a certain timer defined in the standard GSM 05.08.

Figure 5:
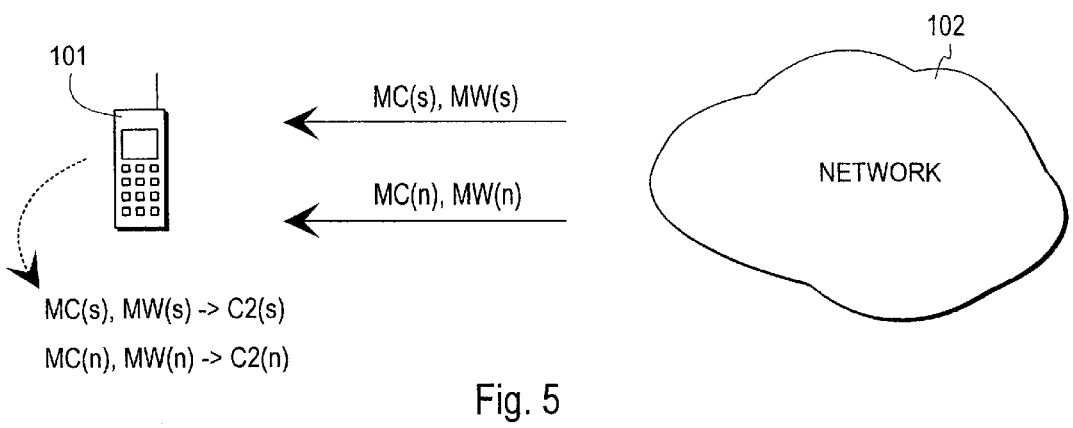
FIG. 5 shows a fourth method according to the invention.

The MC and MW values shown in FIG. 5 are used according to a simpler embodiment of the invention in the same manner as above, whereby the formulae for the calculation of the C2 parameter will be $$C2(T)=C1+MC*MW+\text{CELL\_RESELECT\_OFFSET}-\text{TEMPORARY\_OFFSET}*H(\text{PENALTY\_TIME}-T) \quad (3a')$$

when the PENALTY_TIME<>11111, and $$C2C1+MC*MW-\text{CELL\_RESELECT\_OFFSET}, \quad (3b')$$

when PENALTY_TIME 11111.

The calculation of the parameter value C2 is not separately shown in the formulae 3a' and 3b' for the current cell (s) and its neighbour cells (n), but this difference is included in the definition of the function H. The values MC and MW can be the same both for circuit switched and packet switched connections, or different values MC and MW can be used for circuit switched and packet switched connections. The last mentioned alternative has an advantage in that the terminals can be controlled to select a cell on the basis of both the modulation methods supported by the base stations and other data transmission characteristics obtained with connections of different switching types. In the case of circuit switched connections it is possible to present similar alternative embodiments as above in the case of packet switched connections, i.e. the values MC and MW can be observed already in the calculation of the C1 parameter, or the MW values for each cell can vary according to the cell's loading situation. According to an alternative proposal the cell selection and reselection criteria which were presented for the case of packet switched connections, are applicable as such also in the case of circuit switched connections, and the same principle can be applied also for the modulation-dependent case.

Figure 6:
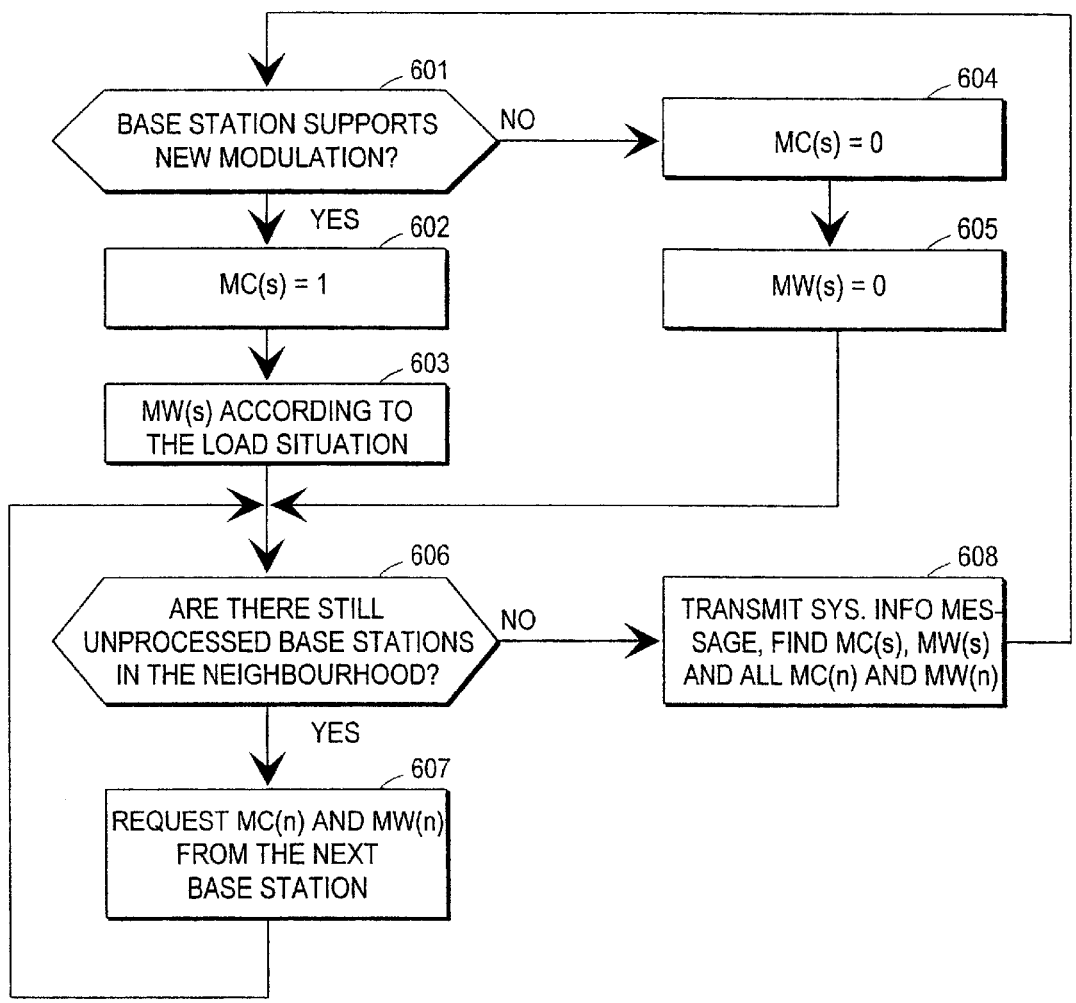
FIG. 6 shows in a flow diagram the functions of a base station according to the invention.

FIG. 6 shows the operation of a base station of a cellular system according to the invention for transmitting information representing the modulation methods to the terminals. In the figure it is assumed that both the MC value and the MW value are used, and that the MW value is determined according to the loading situation. If the base station itself supports the new modulation methods it sets MC(s) to 1 in state 602 and selects the MW(s) value according to the loading situation in state 603. A base station which supports only the old modulation sets the MC(s) and MW(s) to zero in the states 604 and 605. Instead of setting the MC and MW to zero the base station could leave them untransmitted altogether. The base station performs a polling round represented by the states 606 and 607, where it requests all neighbour base stations to transmit the most recent MC(n) and MW(n) values. When all neighbour base stations have been polled the base station transmits all acquired values to the terminals in a certain system information message according to state 608, and then it returns to state 601.

Figure 7:
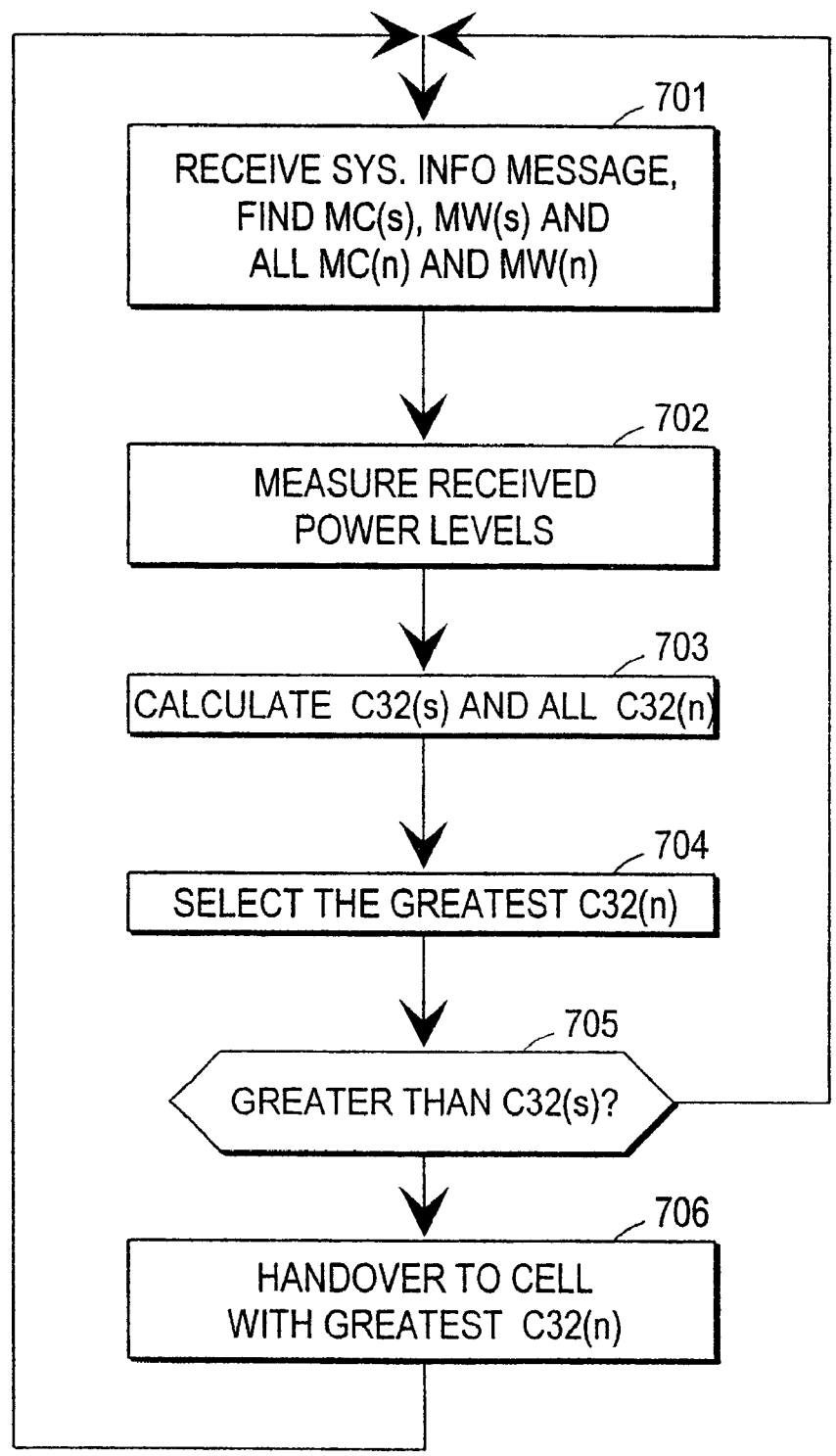
FIG. 7 shows in a flow diagram the functions of a terminal according to the invention.

FIG. 7 shows the operation of a terminal according to the invention in order to utilise information representing the modulation methods in the cell reselection. When it has received the MC(s), the MW(s) and all MC(n) and MW(n) values, and when it has measured the signal levels received from the neighbouring base stations in the states 701 and 702, then the terminal calculates the values of the C32 parameters in state 703, selects the highest C32(n) value representing the neighbour cells in state 704, and compares it with the C32(s) value of the current cell in state 705. If the comparison shows that the new cell is more suitable, then a cell reselection known per se is performed according to state 706 before the operation returns to state 701.

Figure 8:
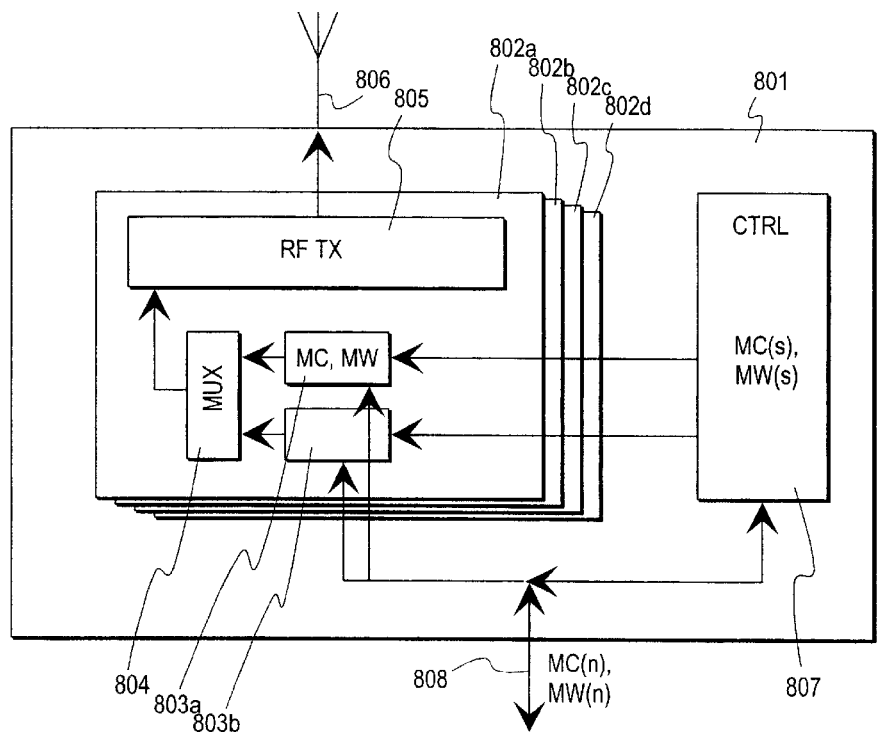
FIG. 8 shows a base station according to the invention.

FIG. 8 shows schematically a base station 801, comprising parallel transmitters 802a, 802b, 802c, 803d for transmitting information on different channels to the terminals. The transmitter 802a is intended for the transmission of the cell's general control information, and it contains parallel sections 803a and 803b in order to generate those different information parts, which form the cell's common control information. The messages transmitted on the cell's broadcast control channel are assembled in the multiplexer 804 and transmitted via the radio frequency section 805 and the transmission antenna 806. The control section 807 controls the operation of the whole base station and supplies i.a. the values MC(s) and MW(s) representing the own modulation characteristics to the block 803a. The base station communicates via a duplex data connection 808 with other base stations and the other stationary parts of the cellular network, from which it obtains i.a. information about the MC(n) and MW(n) values of the base stations in the neighbourhood. The control section 807 can maintain real-time information about how much there is unoccupied space in the transmission frames available in the base station's cell, whereby it can determine the MW(s) value on the basis of the momentary loading situation.

Figure 9:
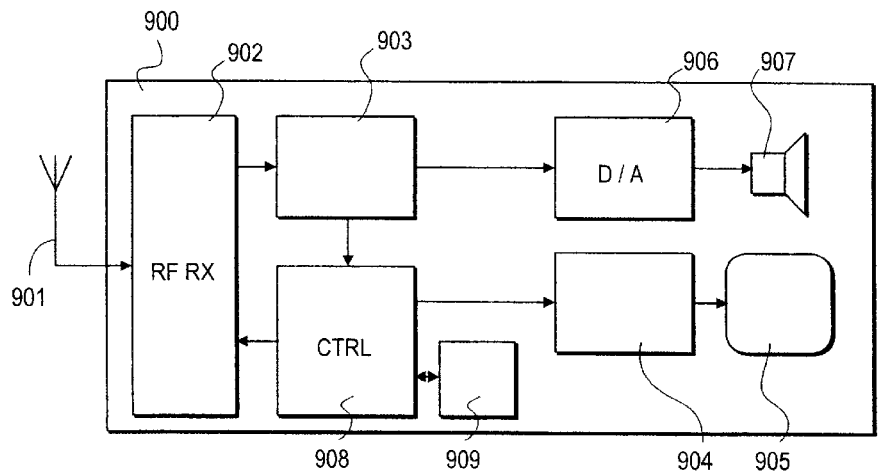
FIG. 9 shows a terminal according to the invention.

FIG. 9 shows schematically a cellular system terminal 900 with sections of which the figure shows the antenna 901, the radio frequency section 902, the channel decoding and demultiplexing section 903, the display driver 904 and the display 905, the D/A converter 906 and the speaker 907 as well as the control block 908. The channel decoding and demultiplexing section 903 directs the speech signal received during a call via the D/A converter 906 to the speaker 907 and all data signals to the control block 908. The information representing the base stations and transmitted on the cell's broadcast control channel are stored in the memory 909 by the control block 908. To be able to operate in the manner according to the invention the control block 908 must be programmed so that it can receive and store the MC and MW values representing the base stations and use them when it calculates the values C1, C2, C31 and/or C32, on the basis of which cell reselection is made. FIGS. 8 and 9 show only those sections of the base station and the terminal, which are essential regarding the invention. Of course the devices can contain a plurality of other components.

Above we treated mainly the GSM system. However, the principle of the invention can also find application in other cellular systems where new modulation methods are taken into use. There the new modulation methods may be other modulation methods than those mentioned above, and the cell selection criteria can differ from the C1, C2, C31 and C32 criteria presented above. In all systems embodying the invention there may also be more than two modulation methods, whereby the invention can be applied for instance so that all different modulation methods are given priorities in mutually different ways, or so that a certain old modulation method has a lower priority than the new modulation methods, whereby the newer modulations, however, get priorities in a mutually similar way. Above it was mentioned that the information relating to weighting factors and modulation support are transmitted from the base stations to the terminals as two parameters (MC, MW); in some systems it may be appropriate to transmit this information in the form of one parameter, or in the form of three or more parameters.

Regarding cell selection a terminal can be given more power than presented above. One alternative is that the terminal does not use the MC value transmitted by the base station in the above presented formulae, but instead it uses a value determined in the terminal which indicates the choice made by the terminal regarding the use of a new modulation in the receiving direction (then the MW value indicates that the terminal supports the new modulation). In some situations it may be advantageous to give the terminal's user a possibility to deny the use of a modulation, for instance with an instruction entered via the keyboard. This can be the case for instance in a situation where it is previously known that a certain modulation method in a certain environment provides a poorer connection quality on the data channels than other methods, even if the modulation in question would look advantageous according to other criteria (measured in the idle state). A terminal can temporarily prevent the use of a certain modulation method also without the user's instruction, on the basis of different measurable quantities representing the connection's quality and on the basis of data stored in the memory. The blocking of a certain modulation method can be according to the terminal. The terminal and the user can also be permitted to change the MW value.

Other cell selection methods known per se can be combined with the above presented method. One possibility is to combine the information relating to single users presented in the patent application FI 970855 with the determination of MW and/or MC values or with a factor affecting their modification. It is also possible to use a random factor in the calculation of the MW value, if it is desired to divide the traffic in a random way between otherwise equally valued base stations.

The above presented embodiments are intended to illustrate some features of the invention and not to limit the invention. Above we presented i.a. cell reselection initiated only by a terminal, but the invention does not exclude the possibility that cell reselection would be initiated by the network. A base station controller, a mobile telephone exchange or another device belonging to the network can transmit an instruction for cell reselection or handover to the terminal. The instruction can include certain information about other cells in the neighbourhood of the terminal's current cell and about the modulation methods available in these other cells, the terminal may have received such information previously, or as a response to the instruction received by the terminal it can particularly receive and store such information. Then the terminal finds the most advantageous cell using otherwise similar calculation formulae as above, however so that it does not calculate a C1, C2, C31 and/or C32 value for the current cell, because the network has explicitly asked the terminal to change to another cell.

Above there was no discussion about which multiple access method is used in a cellular system according to the invention. The invention is applicable in cellular systems utilising Time Division Multiple Access (TDMA) as well as in systems utilising Code Division Multiple Access (CDMA).

What is claimed is:

1. A method for providing information related to the selection of cells to a terminal in a cellular radio system which comprises base stations and terminals in which:

the coverage area of each base station constitutes a cell and a certain first base station supports only a certain first modulation method and a certain second base station supports both the first modulation method and at least one other modulation method, the method according to the invention comprising the step of notifying through at least one broadcast message the terminal of which modulation methods are supported by the base stations of those cells which the terminal is able to select in its current location.

2. A method according to claim 1, wherein the step of notifying the terminal corresponds to each base station transmitting a general broadcasting message that comprises an indication about the modulation methods supported by that base station.

3. A method according to claim 2, further comprising the step of each base station also transmitting in a general broadcasting message indications about the modulation methods supported by a predetermined number of other nearby base stations.

4. A method according to claim 1, further comprising the step of selecting a new cell for the terminal by utilising the information about which modulation methods are supported by the base stations of those cells which the terminal is able to select in its current location.

5. A method according to claim 1 wherein, in order to indicate which modulation methods are supported by a certain base station, a plurality of values are communicated to the terminal, whereby the values indicate whether the respective base station supports any other modulation method than said first modulation method and how large a weight has to be given to the modulation method when the suitability of the base station as a base station of a new cell is evaluated.

6. A method according to claim 4 wherein at least one value communicated to the terminal is selected according to the base station's momentary loading situation.

7. A method according to claim 4 wherein, in order to indicate which modulation methods a certain base station supports, two values are communicated to the terminal, of which values the first one indicates whether the respective base station supports any other modulation method than said first modulation method, and of which the second one indicates how large a weight has to be given to the modulation method when the suitability of the base station as the base station of a new cell is evaluated.

8. A method according to claim 7 wherein said second value is selected according to the base station's momentary loading situation.

9. A method according to claim 8 wherein said second value is selected as a high value if the base station is lightly loaded, and as a low value if the base station is heavily loaded.

10. A method according to claim 1 wherein in order to indicate which modulation methods a certain base station supports there is communicated one value, which indicates that the base station supports also other modulation methods than the first modulation method.

11. A method according to claim 10 wherein in order to indicate which modulation methods a certain base station supports there is communicated one value which, when it has a non-zero value, indicates that the base station supports also other modulation methods than the first modulation method.

12. A method according to claim 10 wherein the communicated value further indicates how high a weighting value has to be given to the modulation method when the base station's suitability is determined as the base station of a new cell.

13. A method according to claim 1 wherein a new cell for the terminal is selected by giving to each of those cells which are possible new cells of the terminal a priority value, wherein the cells supporting the other modulation method are given a higher priority value than the cells supporting only the first modulation method, and selecting as the new cell the possible new cell with highest priority value.

14. A method according to claim 13 wherein those cells which are possible new cells and support some other modulation methods than the first modulation method are given mutually different priority values according to which modulation methods they support.

15. A base station of a cellular system, comprising:

means for broadcasting general control information to terminals in the base station's cell, and means for including information about which modulation methods are supported by the base station in the general control information broadcast to the terminals.

16. A base station according to claim 15, further comprising means for including in the general control information transmitted to the terminals information about which modulation methods are supported by the other base stations which belong to the neighbourhood of the base station.

17. A base station according to claim 15, further comprising means for generating information relating to how much there is unoccupied space in the transmission frames used in the base station's cell, and means for including information representing that fact in the control information transmitted to the terminals.

18. A cellular system terminal comprising:

means for receiving broadcast information from a base station, means for generating and processing comparison information representing several base stations in selecting a cell, and means for including received broadcast information about which modulation methods the base stations support in the generation of said comparison information.

19. A terminal according to claim 18, further comprising means for receiving instructions from a user, whereby the terminal is arranged to replace at least one piece of information received from the base station with the information included in the instruction given by the user in the generation of said comparison information.

20. A terminal according to claim 18, further comprising memory means, whereby the terminal is arranged to replace at least one piece of information received from the base station with information read from the memory means in the generation of said comparison information.

* * * * *